(12) United States Patent  
Litzenberger

(10) Patent No.: US 6,735,381 B2
(45) Date of Patent: May 11, 2004

(54) CAMERA PANEL ASSEMBLY HAVING ONE-PIECE LENS COVER/SLIDER

(75) Inventor: Michael Litzenberger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/264,743

(22) Filed: Oct. 4, 2002

(65) Prior Publication Data

US 2004/0067053 A1 Apr. 8, 2004

(51) Int. Cl.[7] ................................................ G03B 17/02
(52) U.S. Cl. ............................................ 396/6; 396/448
(58) Field of Search ....................................... 396/6, 448

(56) References Cited

U.S. PATENT DOCUMENTS

| 3,766,841 | A |   | 10/1973 | Finnegan et al. |
| 3,798,670 | A |   | 3/1974  | Tanaka |
| 3,942,864 | A |   | 3/1976  | Numbers |
| 4,283,132 | A |   | 8/1981  | Engelsmann et al. |
| 4,295,706 | A |   | 10/1981 | Frost |
| 4,681,418 | A |   | 7/1987  | Kodaira |
| 5,047,792 | A |   | 9/1991  | Asano et al. |
| 5,867,742 | A | * | 2/1999  | Salvas et al. ............... 396/263 |
| 5,913,089 | A |   | 6/1999  | Ebe |
| 6,257,776 | B1 | * | 7/2001 | Sakimoto .................... 396/448 |
| 6,290,112 | B1 | * | 9/2001 | Iver ............................ 224/271 |
| 6,304,728 | B1 |   | 10/2001 | Bittner |

* cited by examiner

Primary Examiner—David M. Gray
(74) Attorney, Agent, or Firm—Robert Luke Walker

(57) ABSTRACT

A panel assembly has a slider that is a one-piece plastic casting. The casting has a closure having a margin and a pair of opposed arms joined to the closure. The arms and closure together have a continuous inner surface and a continuous outer surface. The inner and outer surfaces are opposed and define a thickness dimension. The inner and outer surfaces adjoin the margin. The arms are each resiliently bendable about a respective bending axis. The bending axes are each perpendicular to the inner and outer surfaces.

20 Claims, 4 Drawing Sheets

CAMERA PANEL ASSEMBLY HAVING ONE-PIECE LENS COVER/SLIDER

FIELD OF THE INVENTION

The invention relates to cameras having a lens opening or other opening covered by a lens cover/slider and more particularly relates to a camera front panel assembly or other panel assembly with a one-piece lens cover/slider.

BACKGROUND OF THE INVENTION

Cameras and other handheld devices commonly have cases in which one or more members have openings that are closed by movable covers. With many cameras, a front panel has a lens cover that moves in or out of position to open or close a lens opening. For example, U.S. Pat. Nos. 4,295,706; 5,913,089; 4,283,132; 3,942,864 all disclose cameras having movable lens covers. Some of these cameras provide a snap-action in which the lens cover is biased toward open and closed positions and is biased away from intermediate positions between the open and closed positions.

One-time-use cameras are subject to very tight cost constraints and marketed one-time-use cameras have avoided the use of lens covers. U.S. Pat. No. 5,047,792 discloses the use of an over-center (snap action) mechanism to switch a standard taking lens and a macro lens, but this is a primary functional feature rather than a lens cover. Most of the lens covers in the patents mentioned above have a relatively large number of parts. The multiple steps required to assemble a number of parts add costs, in addition to the costs of the parts themselves. Cameras have been marketed, in which a sliding lens cover is provided by two or three parts, in addition to a front cover panel. In some cases, the cover incorporates an over-center mechanism.

U.S. Pat. No. 4,295,706 discloses a one-piece lens cover-sunshade that fits on the end of a lens barrel. The lens cover-sunshade incorporates an over-center mechanism. A shortcoming is that the one-piece mechanism is assembled from two pieces when it is manufactured.

A further constraint on one-time-use cameras is imposed by recycling processes. Front covers of one-time-use cameras are commonly reused by camera manufacturers in the form of material feedstock. The materials used for parts that remain attached to a front cover after one-time-use camera disassembly are selected with this in mind. For example, printed labels are made of a compatible polymer rather than paper.

It would thus be desirable to provide an improved slider and panel assembly in which the slider is made in one-piece, and is simple and convenient to assemble with the panel and to use.

SUMMARY OF THE INVENTION

The invention is defined by the claims. The invention, in its broader aspects, provides a panel assembly that has a slider, which is a one-piece plastic casting. The casting has a closure having a margin and a pair of opposed arms joined to the closure. The arms and closure together have a continuous inner surface and a continuous outer surface. The inner and outer surfaces are opposed and define a thickness dimension. The inner and outer surfaces adjoin the margin. The arms are each resiliently bendable about a respective bending axis. The bending axes are each perpendicular to the inner and outer surfaces.

It is an advantageous effect of the invention that an improved slider and panel assembly are provided, in which the slider is made in one-piece, and is simple and convenient to assemble with the panel and to use.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
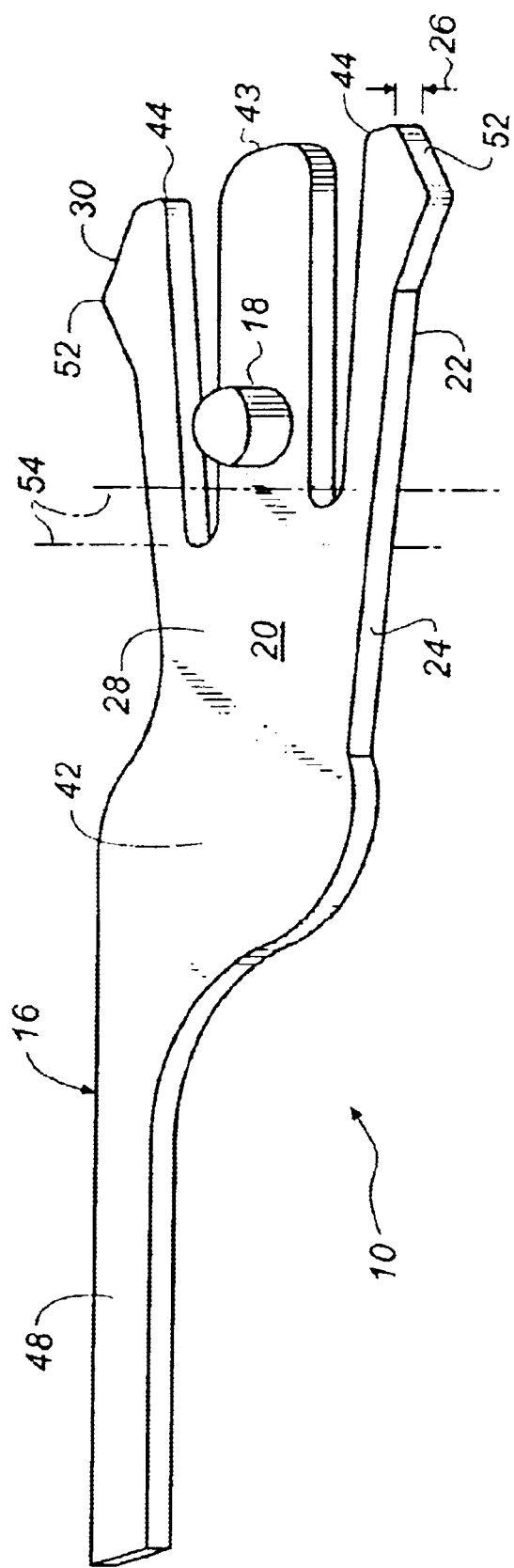
FIG. 1 is a perspective view of an embodiment of the slider.
Figure 2:
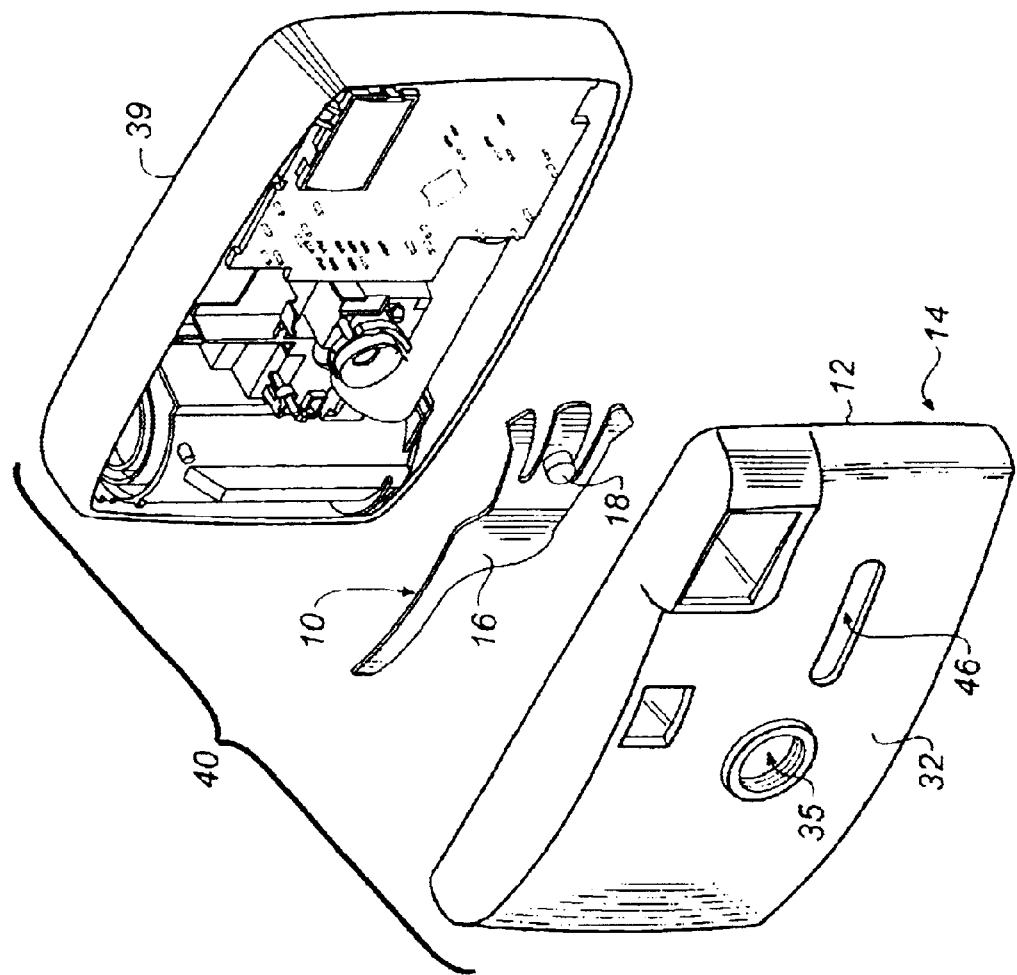
FIG. 2 is a partially exploded perspective view of a camera having a front panel assembly that includes the slider of FIG. 1.

The slider 10 is a one-piece plastic casting that is assembled with a panel or support 12 to provide a panel assembly 14. The casting has a body 16 and a grip 18. The body 16 has a continuous inner surface 20 and a continuous outer surface 22 and a margin 24 extending between the inner and outer surfaces 20,22. The inner and outer surfaces 20,22 are opposed and define a thickness dimension (indicated by double-headed arrow 26 in FIG. 1). This thickness dimension is small, and, in particular embodiments, the thickness is uniform throughout the body 16. This keeps the space required for the slider small. The body 16 includes a closure 28 and a biaser 30.

The panel 12 of the panel assembly 14 has opposed front and back surfaces 32,34 and an opening 35 extending between the front and back surfaces 32,34. The panel 12 has a plurality of guides 36 that define a track 38 for the slider 10. The guides 36 are located adjacent the opening 35, such that the track 38 crosses the opening 35.

The slider 10 is reciprocally slideable along the track 38 defined by the guides 36, between open and closed positions. The closure 28 covers the opening 35 in the closed position. The closure 28 is spaced from the opening 35 in the open position. The slider 10 is slideable from one of the open and closed positions, through a continuum of intermediate positions to the other of the open and closed positions.

The configuration of the guides 36 is not critical. In the embodiment shown in FIGS. 3–4, the guides 36 are rearwardly extending protrusions of the front panel 12. Each protrusion has a small lip or bead (not separately referenced) that overlaps the slider 10. The margin 24 of the closure 28 bears on the guides 36. The guides 36 are positioned in pairs on opposite sides of the slider 10, so as to hold the slider 10 between the guides 36 and retain the slider on the front panel 12. The slider 10 can be snapped into place on the track 38 by bending the front panel 12 slightly so as to increase the separation between adjoining guides 36.

Figure 5:
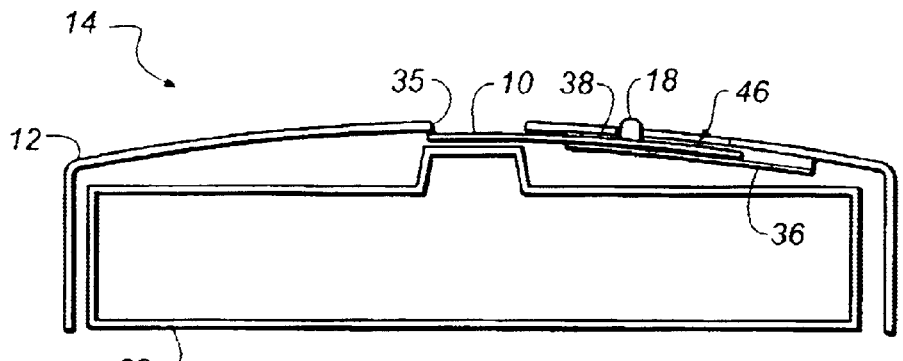
FIG. 5 is a semi-diagrammatical cross-sectional view of another embodiment of the front cover panel assembly, which includes the slider of FIG. 1. The slider is shown in a closed position.
Figure 6:
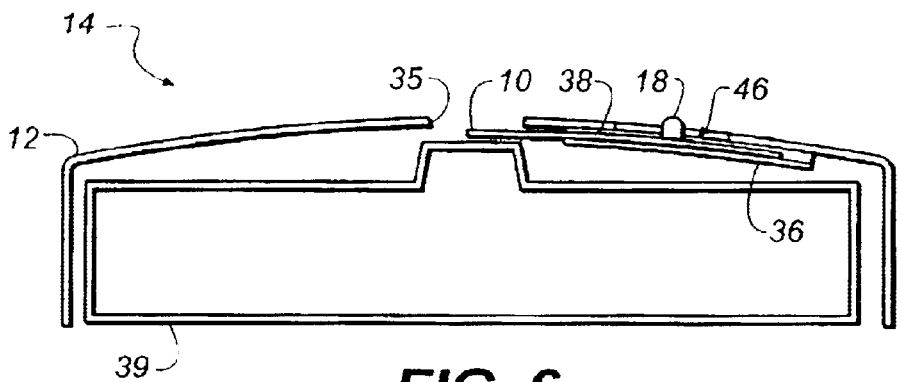
FIG. 6 is the same view as FIG. 5, except the slider is shown in 10 an intermediate position.
Figure 7:
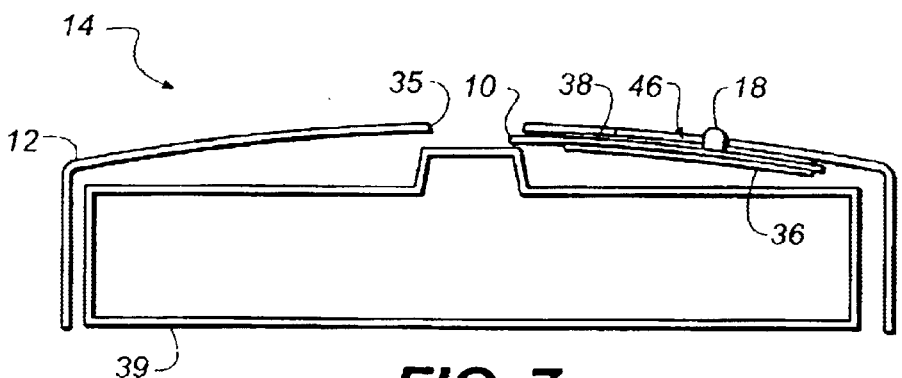
FIG. 7 is the same view as FIG. 5, except the slider is shown in an open position.

In the embodiment shown in FIGS. 5–7, the guides 36 are joined together so as to form a continuous tunnel for the slider 10. The guides 36 define a curved track 38 and the slider 10 follows the track 38 between the positions. The closure 28 can be manufactured in a curved shape or can be resiliently bent so as follow the curved track 38.

The slider 10 can also be held in place by guides 36 that are part of another structure than the panel assembly 14, such as the frame assembly (not shown). This approach is not preferred. It is preferred that the guides 36 hold the slider 10 on the panel 12 when the camera is fully assembled and when the panel 12 is separated from the remainder 39 of the camera 40.

The closure 28 has a main portion 42 and a tang 43 extending outward from the main portion 42. In the embodiment of FIG. 1, the tang 43 is disposed between arms 44 of the biaser 30. The grip 18 is joined to and extends forward from the closure 28. In the embodiment shown in FIG. 1, the grip 18 extends forward from the tang 43. The grip 18 protrudes through a space 46 in the panel 12 and is manipulated by the user to change the position of the slider. The closure 28 can have an optional extension 48 that extends outward from the main portion 42 opposite the tang 43.

The biaser 30 is resiliently bendable toward the closure 28, from an unbiased position to a biased position. The biaser 30 has one or more arms 44. The biaser 30 biases movement of the slider 10 between two or more positions. In some embodiments, the biaser 30 has opposed arms 44, which also resiliently center the slider 10 in the track 38 defined by the guides 36.

In particular embodiments, one of the support 12 and the slider 10 has one or more snap-action cams 50 and the other has respective cam followers 52. In the embodiments shown in the figures, the support 12 has a pair of opposed snap-action cams 50 and the slider 10 has a pair of corresponding cam followers 52. The cams 50 and respective cam followers 52 bias the slider 10 away from the intermediate positions and toward the nearer of the open and closed positions. In the embodiments shown in the figures the cams 50 and respective cam followers 52 also resiliently center said slider 10 relative to said guides 36.

The arms 44 of the biaser 30 provide the resilient biasing by internal resistance to bending. The bending of each of the arms 44 of the biaser 30 is about a bending axis 54. (Bending is to some extent throughout the length of the arm. The bending axis 54 is defined by the pivoting of the cams 50 or other contact surfaces of the arms 44.) In the embodiments shown, the bending axes 54 are each perpendicular to the inner and outer surfaces 20,22 of the slider 10. With a curved slider 10, the bending axes 54 are locally perpendicular to the inner and outer surfaces 20,22. With a flat slider 10, the bending axes 54 are also perpendicular to a plane through either of the inner and outer surfaces 20,22. With a flat slider 10 or a slider 10 curved along the track 38, the bending axes 54 are also parallel and are both perpendicular to an imaginary line drawn, on a surface of the panel 12, between the bending axes 54. This feature allows the body 16 of the slider 10 and the track 38 required for the slider 10 to be very thin.

In particular embodiments, the body 16 has the same thickness as the panel 12. In the embodiment shown in FIGS. 5–7, the thickness of the panel assembly 14 at the guides 36 is only slightly more than three times the thickness of the panel 12 itself.

The material used for the slider 10 is selected so as to provide a biaser 30 that will bend elastically during expected usage. Suitable materials for this purpose are well known to those of skill in the art. In particular embodiments, the panel 12 and slider 10 are each a one-piece plastic casting and the materials of each are selected for easy recycling. The panel 12 and slider 10 can be polymer-polymer blend compatible thermoplastics. This approach assumes suitable proportions and uniform blending will be provided for a polymer feedstock. A simpler approach is to make both the panel 12 and slider 10 of the same thermoplastic. A suitable material for this purpose is polystyrene or polycarbonate.

Additional features can be provided on the slider 10. For example, the slider 10 can have an extension 48 that provides an additional function. In the embodiment shown in FIGS. 3–4 a first extension 47 partially or fully blocks a viewfinder opening 49 when the slider 10 is in the closed position and is spaced from the viewfinder opening 49 when the slider 10 is in the open position. This alerts the user visually when the slider is in the closed position. A second extension 48 is provided that blocking the path of a user control, such as a shutter release 56. The second extension 48 blocks the shutter release 56 path when the slider 10 is in the closed position. The second extension 48 is spaced from the shutter release 56 path when the slider 10 is in the open position. One or more switch elements 58 can also be mounted to the slider 10 (not shown).

Figure 3:
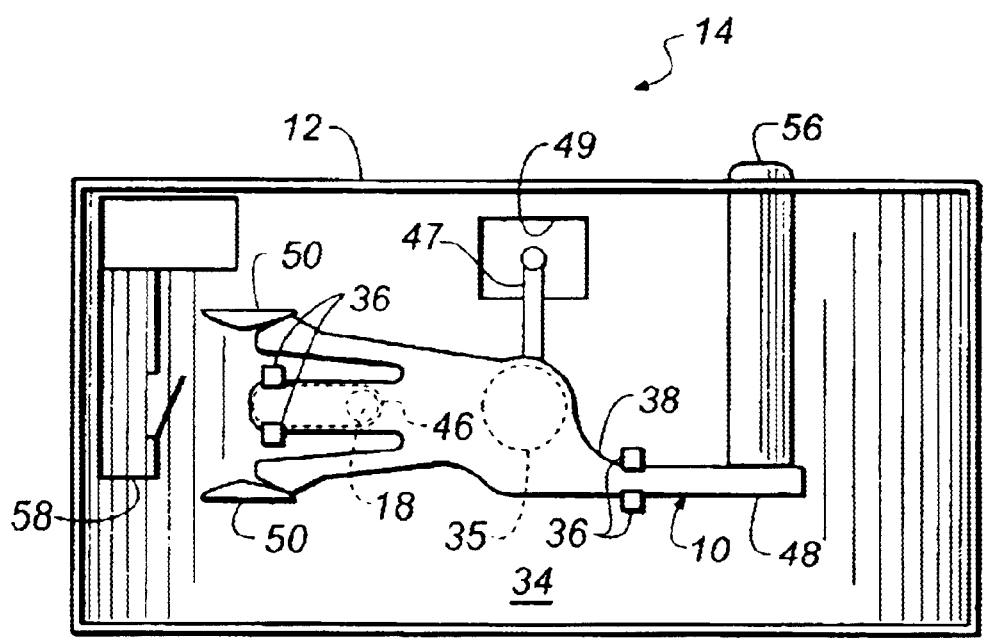
FIG. 3 is a rear view of another embodiment of the front cover panel assembly, which includes the slider of FIG. 1. The slider is shown in a closed position.
Figure 4:
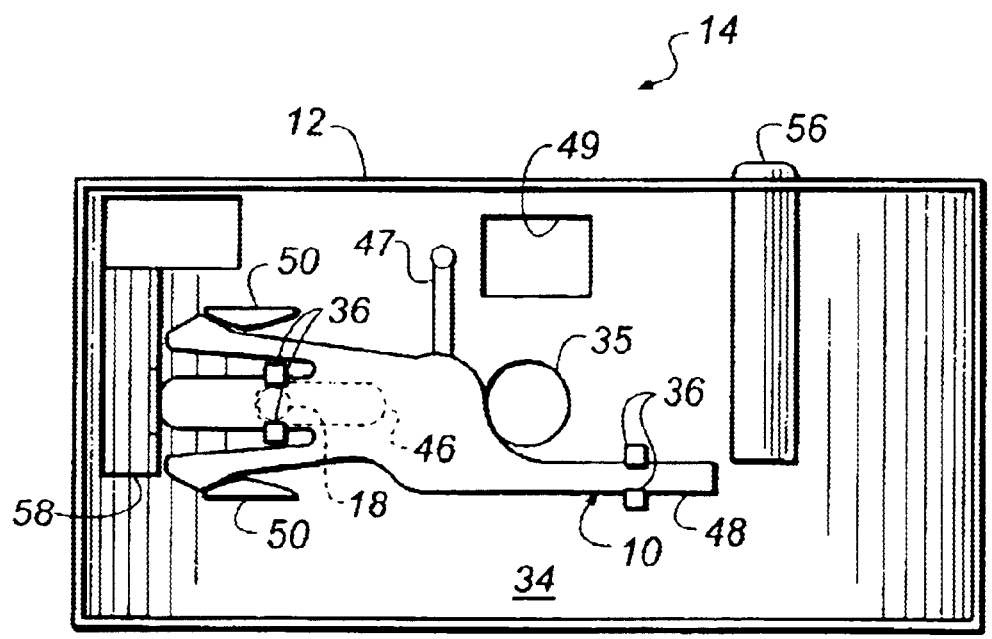
FIG. 4 is the same view as FIG. 3, but the slider is shown in an open position.

Alternatively, one or more parts of the slider 10 can operate a switch mounted in the panel 12, as shown in FIGS. 3–4.

The panel assembly 14 has generally been described herein in relation to a slider 10 that is located on the inner surface 20 of a front cover. The slider 10 can also be located on the outside surface of a front cover or on one of the surfaces of an internal panel, rather than a front cover. The opening 35 can cover something other than a taking lens. For example, a slider 10 can cover a display (not shown) on the back of a camera.

The invention has been described in detail with particular reference to certain preferred embodiments thereof, but it will be understood that variations and modifications can be effected within the spirit and scope of the invention.

What is claimed is:

1. A slider comprising a one-piece plastic casting, said casting including:

a closure having a margin;

a pair of opposed arms joined to said closure, said arms and said closure together having a continuous inner surface and a continuous outer surface, said inner and outer surfaces being opposed and defining a thickness dimension, said inner and outer surfaces adjoining said margin, said arms each being resiliently bendable about a respective bending axis, said bending axes each being perpendicular to said inner and outer surfaces;

wherein said closure has a main portion and a tang extending outward from said main portion between said arms and said casting includes a grip extending forward from said tang.

2. The slider of claim 1 wherein said bending axes are parallel and said arms each being resiliently bendable toward said closure.

3. The slider of claim 1 wherein said closure has a extension extending outward from said main portion opposite said tang.

4. The slider of claim 3 wherein said closure and said arms have a uniform thickness.

5. A panel assembly comprising:

a support having an opening;

a slider held against said support, said slider having a closure, said slider being movable along said support between an open position wherein said closure is spaced from said opening, through a sequence of intermediate positions, to a closed position wherein said closure covers said opening;

wherein said support and said slider are each a one-piece plastic casting, one of said support and said slider has a snap-action cam and the other of said support and said slider has a cam follower, said cam and said cam follower biasing said slider away from said intermediate positions and toward the nearer of said open and closed positions.

6. The panel assembly of claim 5 wherein said slider has a pair of said cams and a pair of said cam followers, and each said cam and respective said cam follower bias said slider away from said intermediate positions and toward the nearer of said open and closed positions, and said cams and respective said cam followers resiliently center said slider relative to said guides.

7. The panel assembly of claim 6 wherein said slider has a uniform thickness.

8. The panel assembly of claim 6 wherein said guides define a curved track and said slider follows said track between said positions.

9. The panel assembly of claim 8 wherein said closure is resiliently bent in at least one of said positions.

10. The panel assembly of claim 5 wherein said support and said slider are polymer-polymer blend compatible thermoplastics.

11. The panel assembly of claim 5 wherein said support and said slider are both made of the same thermoplastic.

12. The panel assembly of claim 5 wherein said slier has a uniform thickness.

13. The panel assembly of claim 5 wherein said closure is resiliently bent in at least one of said positions.

14. A panel assembly comprising:

a support having opposed front and back surfaces and an opening extending between said surfaces, said support having a plurality of guides extending outward from one of said surfaces;

a slider mounted to said support, said slider having a uniform cross-section, said slider having a closure and a biaser joined to said closure, said slider being reciprocally slideable along said guides between open and closed positions, said closure covering said opening in said closed position, said closure being spaced from said opening in said open position, said biaser being resiliently bendable toward said closure, from an unbiased position to a biased position.

15. The panel assembly of claim 14 wherein said biaser resiliently centers said slider in a track defined by said guides.

16. The panel assembly of claim 15 wherein said biaser has a pair of opposed arms, said arms being resiliently bendable toward said closure.

17. The panel assembly of claim 15 further comprising a grip joined to said closure.

18. The panel assembly of claim 14 wherein said support defines a user control path and has a viewfinder opening, and said slider has a first and second extensions joined to said closure, said first extension at least partially blocking said viewfinder opening and said second extension blocking said user control path in said closed position, said extensions, in said open position, being spaced from said viewfinder opening and said user control path, respectively.

19. The panel assembly of claim 18 further comprising a switch element joined to said slider, said switch element being movable between an active state and an inactive by said movement of said slider between said open and closed positions.

20. The panel assembly of claim 14 wherein said closure is resiliently bent in at least one of said positions.

* * * * *